United States Patent
Izaki et al.

(10) Patent No.: US 6,748,228 B1
(45) Date of Patent: Jun. 8, 2004

(54) CORDLESS TELEPHONE

(75) Inventors: Masahiro Izaki, Hirakata (JP); Keisuke Nakaya, Daito (JP)

(73) Assignee: Sanyo Electric Co., Ltd., Osaka (JP)

(*) Notice: Subject to any disclaimer, the term of this patent is extended or adjusted under 35 U.S.C. 154(b) by 387 days.

(21) Appl. No.: 09/632,909

(22) Filed: Aug. 4, 2000

(30) Foreign Application Priority Data

Aug. 6, 1999 (JP) .......................................... 11-223652

(51) Int. Cl.$^7$ ................................................ H04B 7/00
(52) U.S. Cl. ...................................... 455/462; 455/573
(58) Field of Search .............................. 455/461–464, 455/572–574, 410–411; 379/62

(56) References Cited

U.S. PATENT DOCUMENTS

| | | | | |
|---|---|---|---|---|
| 4,593,155 A | * | 6/1986 | Hawkins ..................... | 455/411 |
| 4,731,813 A | * | 3/1988 | Schroeder ................... | 455/410 |
| 4,736,404 A | * | 4/1988 | Anglikowski et al. ...... | 455/411 |
| 4,768,219 A | * | 8/1988 | Yamagata et al. .......... | 455/464 |
| 5,408,682 A | * | 4/1995 | Ranner et al. ............ | 455/166.2 |
| 5,448,764 A | * | 9/1995 | Sondermann et al. ......... | 455/88 |
| 5,500,888 A | * | 3/1996 | Chiu et al. ................... | 455/410 |
| 5,764,685 A | * | 6/1998 | Tanaka et al. ............... | 375/130 |
| 5,787,356 A | * | 7/1998 | Tanaka et al. ............... | 455/464 |
| 6,163,703 A | * | 12/2000 | Lee ............................. | 455/462 |
| 6,212,410 B1 | * | 4/2001 | Ishida ......................... | 455/572 |
| 6,473,613 B2 | * | 10/2002 | Beamish et al. ............. | 455/435 |

* cited by examiner

*Primary Examiner*—Nay Maung
*Assistant Examiner*—Tan Trinh
(74) *Attorney, Agent, or Firm*—Arent Fox PLLC

(57) ABSTRACT

A cordless telephone includes a handset cordlessly linked to a base unit. The base unit includes a storage device for storing a security ID. A detection device detects a start of a charge. A first transmission device transmits the security ID to the handset. A generating device generates a new security ID which is different from the security ID. A second transmission device transmits the new security ID to the handset. A judging device judges whether a response corresponds to either the security ID transmitted by the first transmission device or the new security ID transmitted by the second transmission device has been received from the handset. A link device establishes a cordless link with the handset. An update device updates the security ID stored in the storage device. The new security ID is generated when response from the handset is not received within a predetermined time.

18 Claims, 6 Drawing Sheets

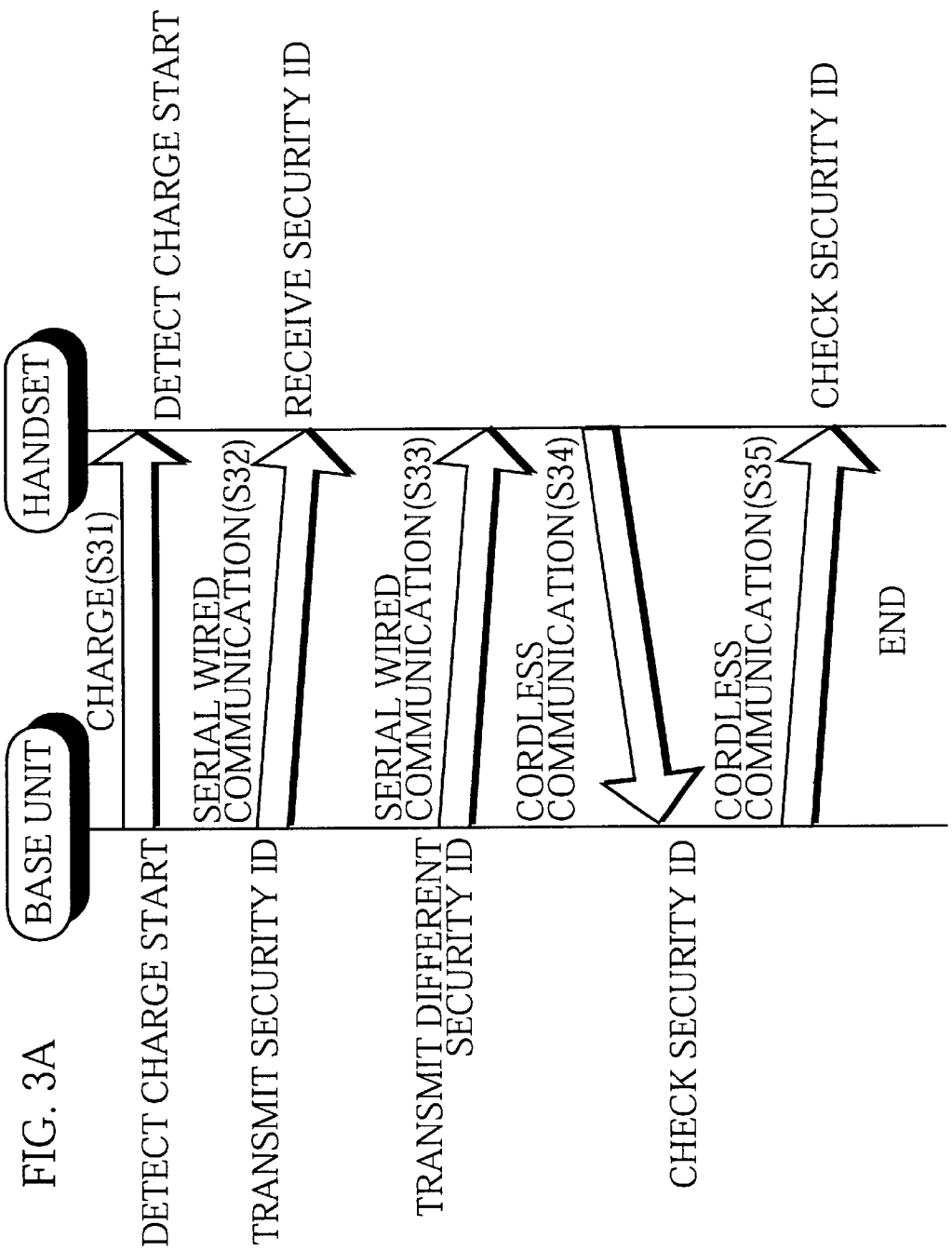

CORDLESS TELEPHONE

BACKGROUND OF THE INVENTION (1) Field of the Invention

The present invention relates to a cordless telephone composed of a handset and a base unit which functions as a cradle for holding the handset for charging.

(2) Description of Related Art

In some countries, for example, in North American countries, base units and handsets in cordless telephone systems can be purchased separately, and base units and handsets of same models can establish cordless links (also referred to as parent-child relationships, where a parent represents a base unit and a child represents a handset) so that the persons at the handsets can receive incoming calls and make phone calls through the cordless links. A base unit and a handset in a parent-child relationship preserve the same security code (also referred to as security ID) which is used for identifying the parent-child relationship.

The following is a description of the first and second prior arts which are based on the above technique where a base unit and a handset in a parent-child relationship preserve the same security ID.

The first prior art is Japanese Patent Publication No. 5-41051 that discloses a cordless telephone. The cordless telephone is composed of: a base unit which is connected to a telephone line and is used as a cradle for holding a handset for charging; and the handset that operates on a rechargeable battery.

The base unit generates a new security ID using a random number and stores the generated security ID into a memory and transmits the generated security ID to the handset each time the base unit starts charging the handset. The handset receives the new security ID from the base unit and stores the received security ID into a memory after the charge begins.

As described above, the cordless telephone disclosed in the first prior art, in which both the base unit and the handset store a new random number as the security ID each time the handset is placed on the base unit and starts being charged, has the following merits.

When another handset, which has not been in the parent-child relationship with the base unit, is placed on the base unit, the other handset and the base unit establish a parent-child relationship. When this happens, the user of the original handset recognizes an irregularity since the original handset becomes inoperable. The user then can resume the parent-child relationship by placing the original handset on the base unit, excluding the other handset. This means that, for example, when another handset is put on the base unit by an ill-intentioned person to use the telephone, making a charge to the user's account, the user can notice the irregularity and resume the parent-child relationship by placing the original handset on the base unit, excluding the other handset.

The second prior art also discloses a cordless telephone which is composed of: a base unit which is connected to a telephone line and is used as a cradle for holding a handset for charging; and the handset that operates on a rechargeable battery. Both the base unit and the handset have a wired interface through which serial data is transferred between them. The security ID is transferred between them while the handset is placed on the base unit. The handset includes a rewritable nonvolatile memory such as EEPROM (Electrically Erasable and Programable ROM).

The base unit includes a counter for counting the number of times the base unit has transmitted the security ID to the handset. When the number counted by the counter has not reached a predetermined number (e.g., "10") when the base unit starts charging the handset, the base unit sends the security ID currently stored in the memory to the handset; and when the number counted by the counter has reached the predetermined number, the base unit generates a new security ID using a random number and sends the newly generated security ID to the handset. Upon receipt of a security ID from the base unit, the handset stores the received security ID into the nonvolatile memory (EEPROM) only when the received security ID is different from a security ID which is stored in the nonvolatile memory.

The first prior art, however, has a problem that when a flash memory is used as the memory for storing the security ID, the flash memory loses its life each time the security ID is updated for each charging since the flash memory can be rewritten only a limited number of times.

According to the second prior art, when another handset is put on the base unit and establishes a parent-child relationship with the base unit based on an illegal intention, both the original handset and the other handset can be used until the number in the counter reaches the predetermined number, and during this period, the user cannot detect the irregularity and fails to exclude the other handset.

SUMMARY OF THE INVENTION

It is therefore at object of the present invention to provide a base unit and a handset for use in a cordless telephone which allows the user of the handset to recognize that another handset has established a new parent-child relationship with the base unit, without needless loss of life of the memory.

The above object is fulfilled by a base unit included in a cordless telephone which also includes a handset cordlessly linked to the base unit, the base unit functioning as a cradle for holding the handset for charging, the base unit comprising: a storage means for storing a security ID; a detection means for detecting a start of a charge which occurs when a handset is placed on the base unit; a first transmission means for transmitting the security ID stored in the storage means to the handset when the detection means detects the start of the charge; a generating means for generating, when a response from the handset is not received within a predetermined time, a new security ID which is different from the security ID stored in the storage means; a second transmission means for transmitting the new security ID to the handset; a judging means for judging whether a response corresponding to either the security ID transmitted by the first transmission means or the new security ID transmitted by the second transmission means has been received from the handset; a link means for establishing a cordless link with the handset when the judging means judges that the response has been received from the handset; and an update means for updating the security ID stored in the storage means to the new security ID when the judging means judges that the response has been received and when the received response corresponds to the new security ID.

With the above construction, the base unit transmits the security ID to the handset after a charge starts, uses the security ID without updating when the handset returns a response in a predetermined time period (when the transmitted security ID matches the security ID stored in the handset), and transmits a new security ID to the handset when the handset returns no response in the predetermined time period (when the transmitted security ID does not match the security ID stored in the handset).

With the above arrangement, the security ID is updated to a new security ID only when the transmitted security ID does not match the security ID stored in the handset, that is, when another handset is placed on the base unit; and the security ID is not updated when the two security IDs match. This prevents the memory from being rewritten and losing life needlessly.

In the present construction, the security ID is updated to a new security ID whenever the transmitted security ID does not match the security ID stored in the handset. This enables the user of the original, legitimate handset to recognize the presence of another, illegitimate handset without difficulty since the original handset becomes inoperable.

The above object is also fulfilled by a handset included in a cordless telephone which also includes a base unit which is cordlessly linked to the handset and functions as a cradle for holding the handset for charging, the handset comprising: a storage means for storing a security ID used for identifying a parent-child relationship between the base unit and the handset; a detection means for detecting a start of a charge which occurs when the handset is placed on a base unit; a first reception means for receiving a first security ID which is transmitted from the base unit after the detection means detects the start of the charge; a second reception means for receiving a second security ID transmitted from the base unit; a judging means for judging whether the first security ID matches the security ID stored in the storage means; an update means for updating the security ID stored in the storage means to the second security ID when the judging means judges that the first security ID does not match the security ID stored in the storage means; and a link means for requesting the base unit to establish a cordless link between the base unit and the handset in response to the first security ID when the judging means judges that the first security ID matches the security ID stored in the storage means, and in response to the second security ID when the judging means judges that the first security ID does not match the security ID stored in the storage means.

The above construction provides the same effect as the base unit.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3A is a sequence diagram of security ID transfers between a parent and a child when charging starts;

DESCRIPTION OF THE PREFERRED EMBODIMENTS

Figure 1:
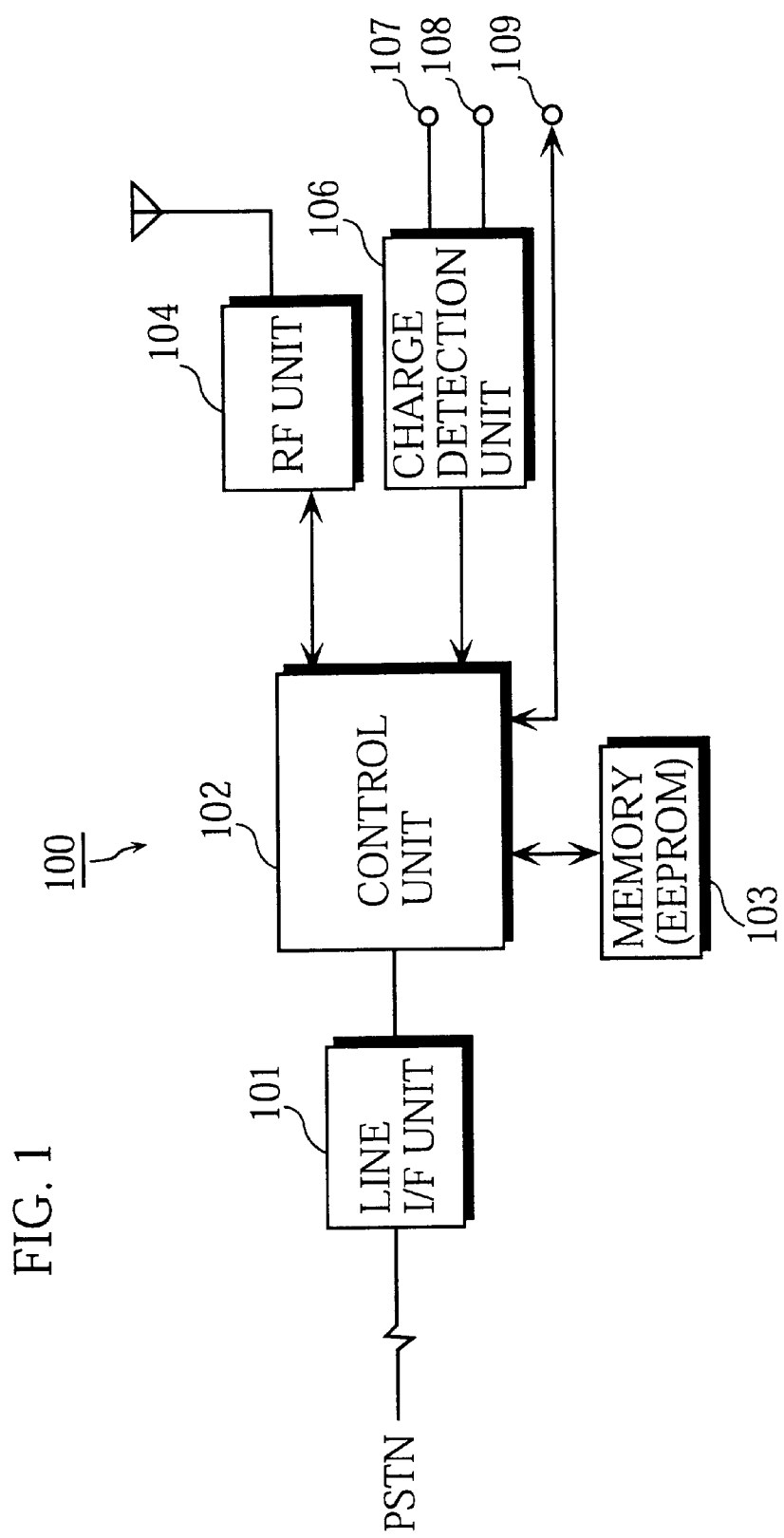
FIG. 1 is a block diagram showing the construction of the base unit of the cordless telephone in the embodiment of the present invention.

The following are description of the present invention through a specific embodiment thereof by way of referring to the drawings.

Base unit Construction Brief

FIG. 1 is a block diagram showing a construction of the base unit of the cordless telephone in the embodiment of the present invention.

The base unit 100 includes: a line I/F unit 101 connected to a PSTN (Public Switched Telephone Network); a control unit 102 for modulating and demodulating audio signals input/output from/to the line I/F unit 101 and managing the security ID; a memory (EEPROM) 103 for storing the security ID used for identifying the parent-child relationship; an RF unit 104 for converting intermediate-frequency signals received from the control unit 102 to high-frequency signals and transmitting the high-frequency signals via an antenna 105, and converting high-frequency signals received from the antenna 105 to intermediate-frequency signals and outputting the intermediate-frequency signals to the control unit 102; a charge detection unit 106 for detecting a start of a charge which starts when the handset is placed on the base unit; charging terminals 107 and 108 used for supplying the handset with a power from a power supply circuit (not shown in the drawings) for the charge; and a serial data terminal 109 connected to a serial port of the control unit 102. The base unit 100 also functions as a charging cradle on which the handset is placed to be charged.

As shown in FIG. 3A, when the charge detection unit 106 detects a start of a charge (S31), the control unit 102 transmits the security ID stored in the memory to the handset via the serial data terminal 109 (S32), then when no response (cordless link establishment request) is received from the handset after a certain time period, generates a new security ID and transmit it to the handset via the serial terminal 109 (S33), and updates the current security ID stored in the memory 103 to the new security ID, receives a response to the new security ID from the handset (S34), and transmits a cordless link establishment response (S35).

Figure 3B:
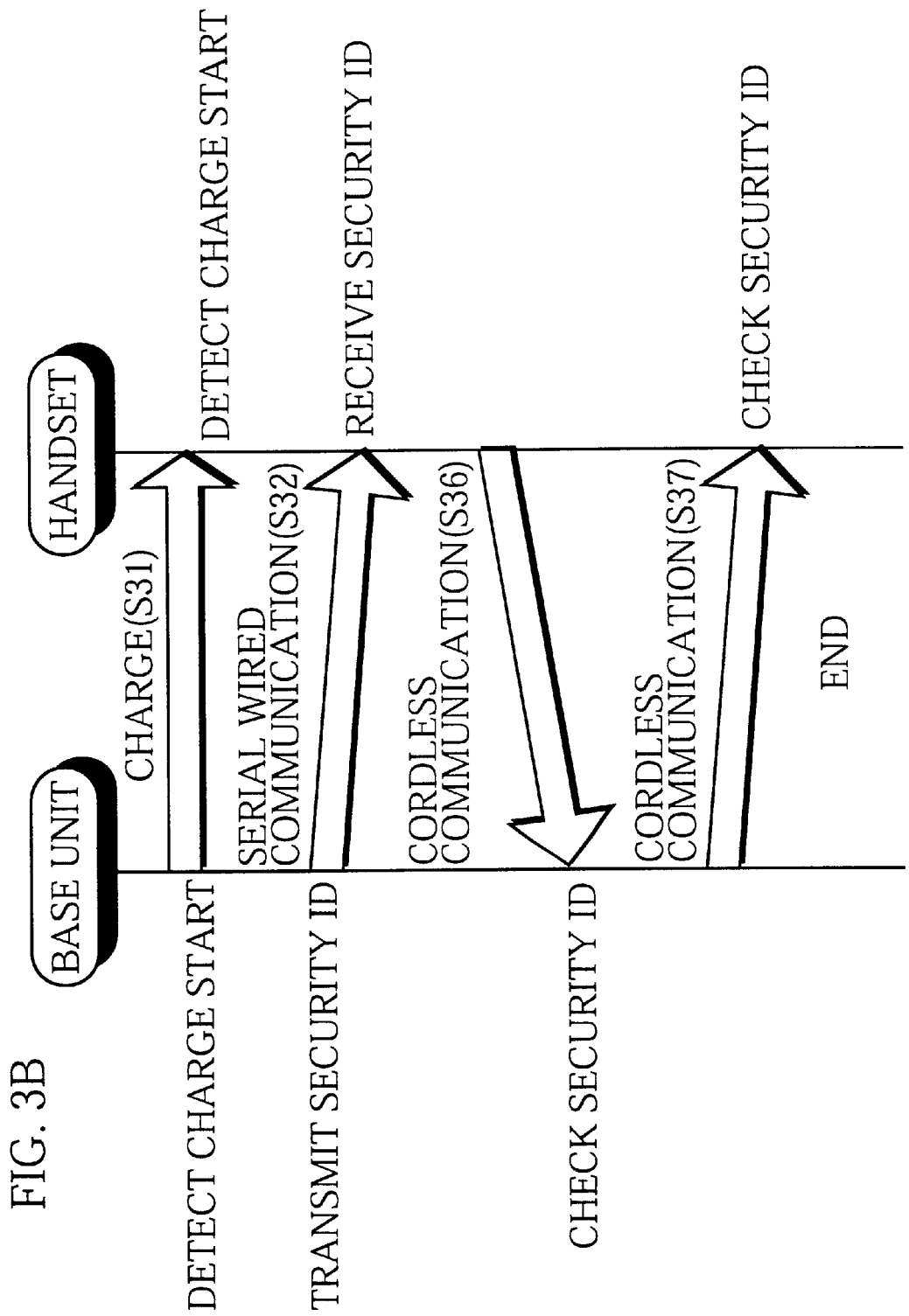
FIG. 3B is a sequence diagram of security ID transfers between a parent and a child when charging starts.

In the above procedure, when the base unit receives a response from the handset during the certain time period (when a response to the security ID transferred in S32 is received in S36 during the certain time period) as shown in FIG. 3B, the control unit 102 uses the current security ID without updating.

The base unit transmits channel information to the handset together with the security ID, the channel information indicating a cordless channel to be used in the cordless link. The handset transmits the cordless link establishment request to the base unit through the cordless channel specified in the channel information. The channel specified in the channel information is one of unoccupied channels detected by the base unit from a plurality of channels assigned to the cordless telephone. The security ID is also referred to as security code, and is in reality data of approximately 24 bits.

Handset Construction Brief

Figure 2:
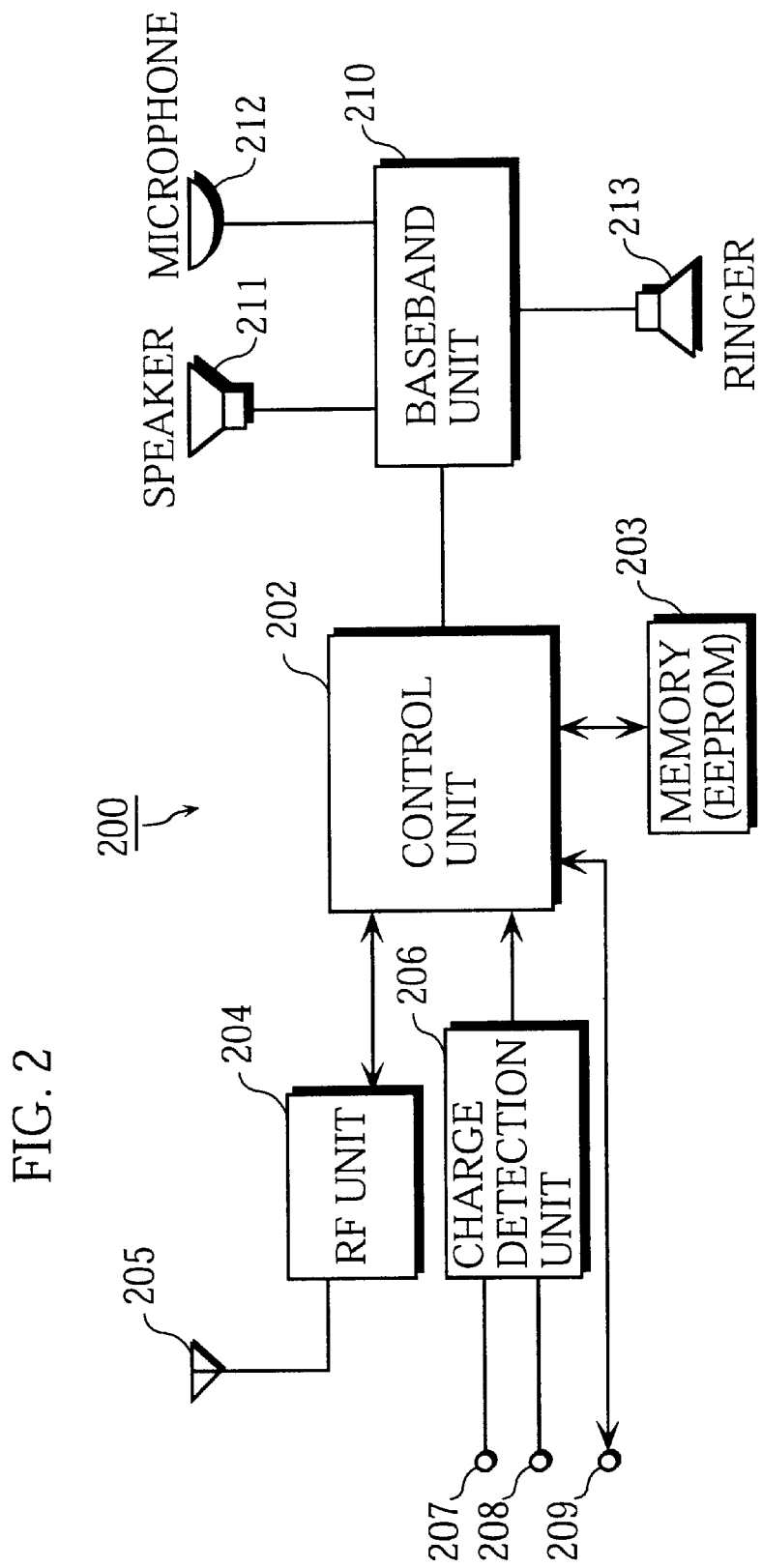
FIG. 2 is a block diagram showing the construction of the handset of the cordless telephone in the embodiment of the present invention.

FIG. 2 is a block diagram showing a construction of the handset of the cordless telephone in the embodiment of the present invention.

The handset 200 includes: a control unit 202 for managing the security ID and controlling the whole handset 200; a memory (EEPROM) 203 for storing the security ID; an RF unit 204 for converting intermediate-frequency signals received from the control unit 202 to high-frequency signals and transmits the high-frequency signals via an antenna 205, and converting high-frequency signals received from the antenna 205 to intermediate-frequency signals and outputting the intermediate-frequency signals to the control unit 202; a charge detection unit 206 for detecting a start of a charge which starts when the handset is placed on the base unit; charging terminals 207 and 208 used for receiving the power for charging from the base unit via the charging terminals 107 and 108; a serial data terminal 209 which is connected to a serial port of the control unit 202 and is used, as is the case with the serial data terminal 109, to transfer serial data between the base unit and the handset; a baseband unit 210 for outputting the audio signal input from the control unit 202 to a speaker 211 and outputting the audio signal input from the microphone 212 to the control unit 202; and a ringer 213 for ringing each time the cordless telephone receives an incoming call.

As shown in FIG. 3A, when the charge detection unit 206 detects a start of a charge (S31), the control unit 202 receives the security ID from the base unit via the serial data terminal 209 (S32), judges whether the received security ID matches the security ID stored in the memory 203, then when they do not match, receives a new security ID from the base unit via the serial data terminal 209 (S33), and updates the memory 203 to the new security ID.

In the above procedure, when the two security IDs match, the control unit 202 uses the security ID received in S32 and does not update the memory 203.

Detailed Flowchart of the Control Unit 102 in the Base unit

The control unit 102 can be achieved by a one-chip LSI (what is called ASIC: Application Specified Integrated Circuit) on which a microcomputer and a modulation/demodulation circuit are mounted. In this case, the microcomputer executes a program to perform the sequence shown in FIGS. 3A and 3B.

Figure 4:
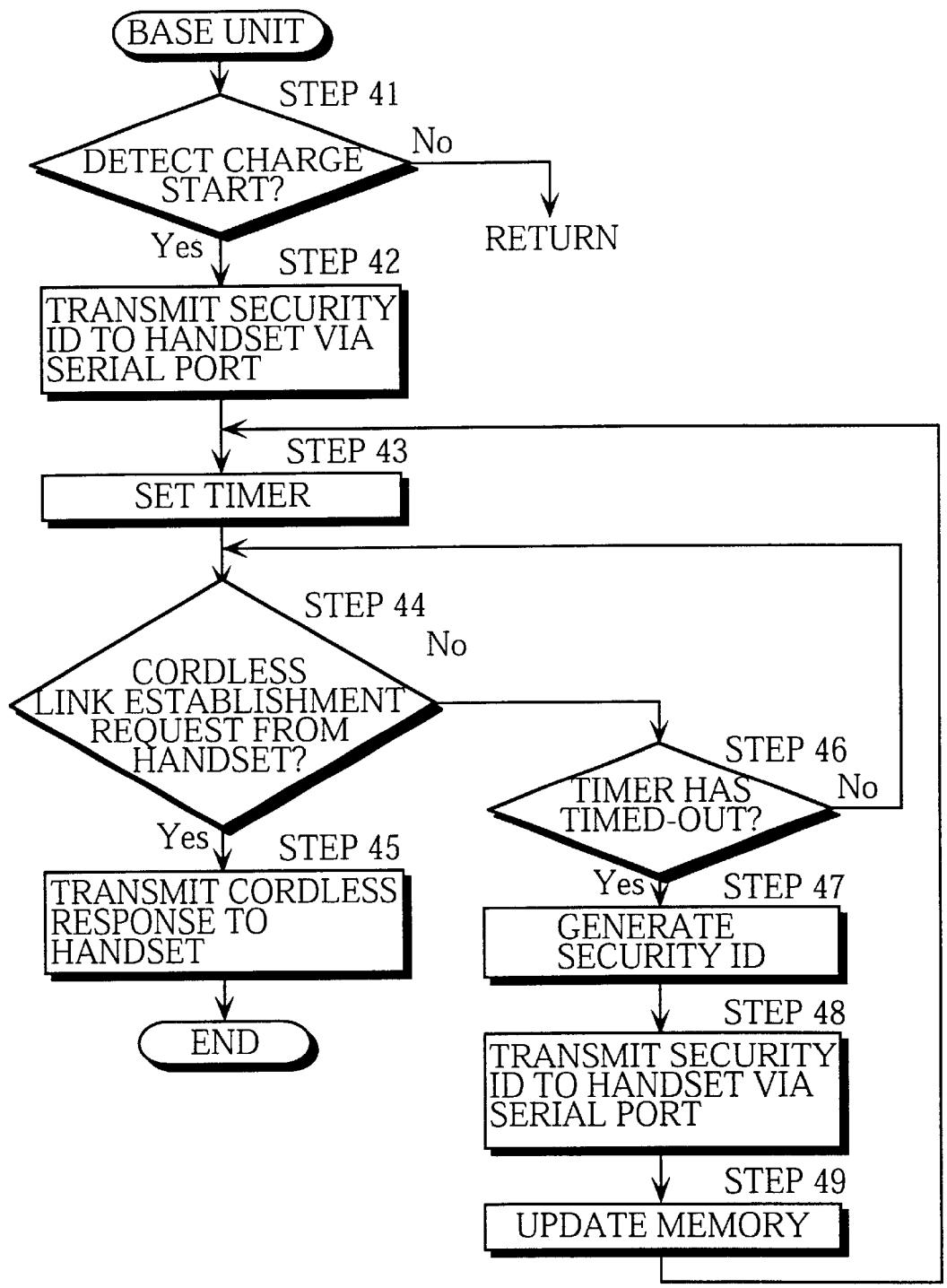
FIG. 4 is a flowchart showing a detailed security ID management performed by the control unit 102 of the base unit.

FIG. 4 is a flowchart showing a detailed security ID management performed by the control unit 102 when a start of a charge is detected.

As shown in FIG. 4, when the charge detection unit 106 detects a start of a charge (step 41), the control unit 102 reads the security ID from the memory 103, and transmits the read security ID to the handset through the serial port and the serial data terminal 109 (step 42), and sets the timeout of a timer (not shown in the drawings) in the control unit 102 for a certain time period (e.g., 600 ms) (step 43).

The control unit 102 then judges whether a response to the previously sent security ID, namely the cordless link establishment request, has been received from the handset (step 44), and judges whether the timer has timed-out (step 46).

When no response is received from the handset during the time-out period, that is, when the transmitted security ID does not match the security ID stored in the handset (judged as "No" in step 44 and "Yes" in step 46), the control unit 102 generates a new if security ID using a random number, and generates the channel information by detecting an unoccupied channel (step 47), transmits the new security ID to the handset via the serial port and the serial data terminal 109 (step 48), and updates the memory 103 to the new security ID (step 49).

With the above arrangement, a new security ID is assigned to a handset when the security ID of the handset does not match the security ID preserved in the base unit. That is to say, a new security ID is assigned to the base unit and a handset that has not been used. If this procedure is done without the user's knowing, the user can recognize an unauthorized use of the cordless telephone since the handset the user has used becomes inoperable due to the mismatch between the security ID (old) preserved in the legitimate handset of the user and the security ID (new) preserved in the base unit. The user can further obtain a new security ID after having recognized an unauthorized use of the cordless telephone. With this operation, the legitimate handset of the user becomes operable again, excluding the illegitimate handset.

In the above procedure, when a response (cordless link establishment request) is received from the handset during the time-out period, that is, when the transmitted security ID matches the security ID stored in the handset (judged as "Yes" in step 44), the control unit 102 transmits the cordless link establishment response to the handset in response to the cordless link establishment request. With this arrangement, the security ID stored in the memory 103 is not updated when the security ID matches the security ID preserved in the handset, that is, when the handset is the one having been used so far. When the memory 103 is an EEPROM, this prevents needless loss of life of the memory 103.

Detailed Flowchart of the Control Unit 202 in the Handset

The control unit 202, as is the case with the control unit 102, can be achieved by a one-chip LSI (what is called ASIC: Application Specified Integrated Circuit) on which a microcomputer and a modulation/demodulation circuit are mounted. In this case, the microcomputer executes a program to perform the sequence shown in FIGS. 3A and 3B.

Figure 5:
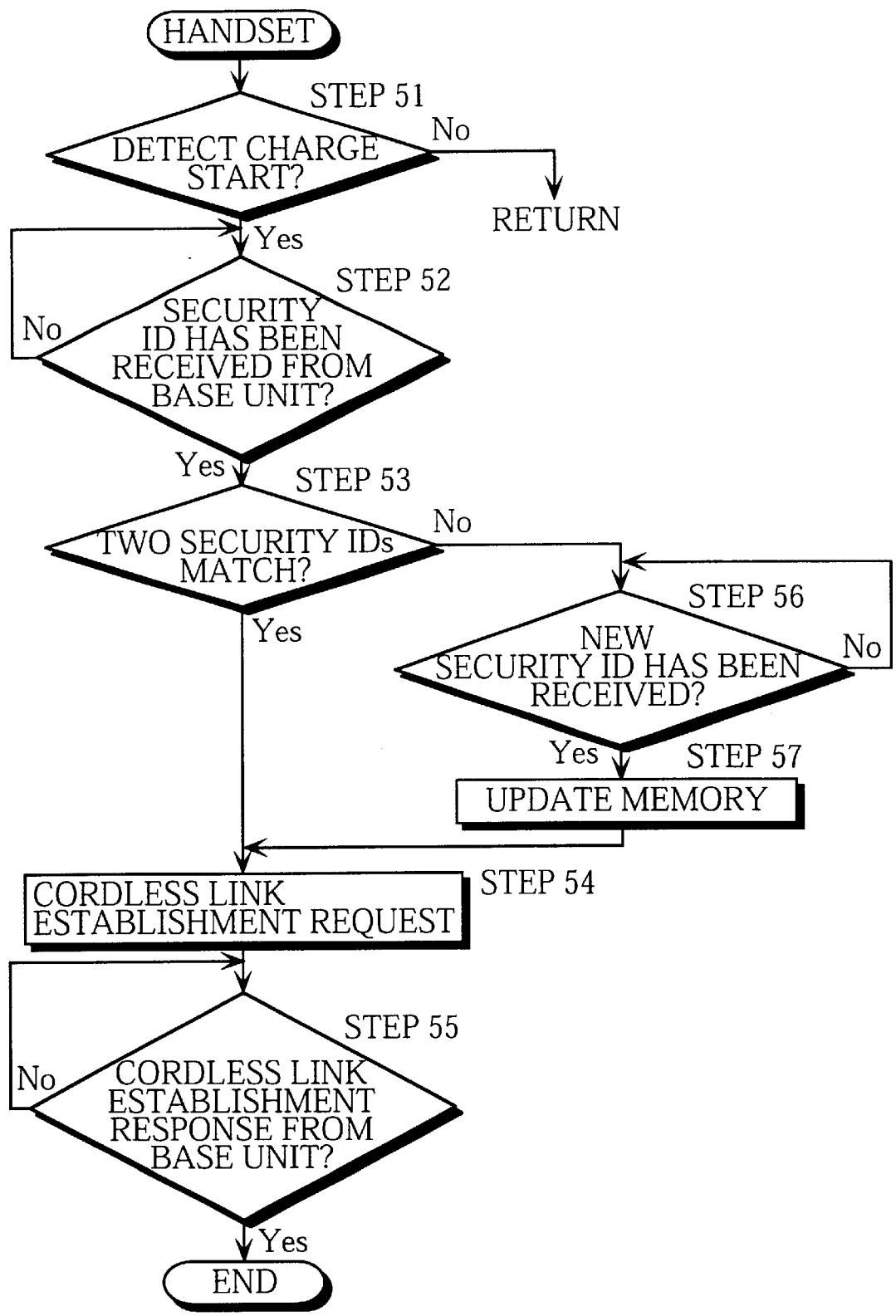
FIG. 5 is a flowchart showing a detailed security ID management performed by the control unit 202 of the handset.

FIG. 5 is a flowchart showing a detailed security ID management performed by the control unit 202 when a start of a charge is detected.

As shown in FIG. 5, when the charge detection unit 206 detects a start of a charge (step 51), the control unit 202 waits for the security ID which is transmitted from the base unit 100 via the serial data terminal 209 (step 52). After the security ID is received, the control unit 202 judges whether the received security ID matches the security ID stored in the memory 203 (step 53). When having judged that the two security IDs match, the control unit 202 transmits the cordless link establishment request to the base unit 100 through a cordless channel specified in the channel information which is included in the received security ID (step 54), waits for the cordless link establishment response which is transmitted from the base unit 100 (step 55). After the cordless link establishment response is received, the handset is in a wait state. With this arrangement, the security ID stored in the memory 203 is not updated when the security ID matches the security ID received from the base unit. When the memory 203 is an EEPROM, this prevents needless loss of life of the memory 203.

In the above procedure, when having judged that the two security IDs do not match (step 53), the control unit 202 waits for a new security ID which is transmitted from the base unit 100 via the serial data terminal 209 (step 56). After the new security ID is received, the control unit 202 updates the memory 203 to the new security ID (step 57). The handset then goes through steps 54 and 55 and is in a wait state.

With the above arrangement, a new security ID is assigned to a handset which has not been the "child"

(referred to as handset A) when the security ID of the handset does not match the security ID preserved in the base unit. That is to say, a new parent-child relationship is established. If this procedure is done without the user's knowing, the user of the original, legitimate handset (referred to as handset B) can easily recognize an unauthorized use of the cordless telephone since the handset B becomes inoperable. The user can then obtain a new security ID by placing the handset B on the base unit. With this operation, the legitimate handset B becomes operable again, excluding the illegitimate handset A.

Other Variations

The charge detection unit 206 monitors the voltage or the current between the charging terminals 207 and 208, and detects a start of a charge when the change of the voltage or current exceeds a threshold value. This is the same for the charge detection unit 106 in the base unit 100.

Each of the base unit and the handset may be provided with a switch for detecting whether the handset has been put on the base unit instead of the detection of a start of a charge by the charge detection units 106 and 206.

In the above embodiment, both the base unit and the handset have wired serial data interfaces. However, serial data may be multiplexed into a power supply line for charging so as to be transferred between the base unit and the handset.

In the above embodiment, the security ID is transferred between the base unit and the handset through a wired line. However, the security ID may be transferred between them through a cordless communication.

In the above embodiment, the security ID is not updated when the security IDs of the base unit and the handset match, that is, when the same handset that has been used so far is put on the base unit. However, the security ID may be updated once every so many times (e.g., once every 10 times) the handset is put on the base unit.

In FIG. 3A, the base unit may transmit a new security ID shown in S33 when transmitting the security ID in S32. For example, the base unit may perform the transmissions in S32 and S33 in succession. In this case, the handset uses the first security ID when the first security ID matches the security ID preserved in the handset, and uses the second (new) security ID (i.e., updates the memory 203) when the first security ID does not match the security ID preserved in the handset. The base unit extracts the security ID from the cordless link establishment request received from the handset, and updates the memory 103 only when the handset returns the second (new) security ID. In this case, the base unit need not monitor the timeout of the timer. This reduces the time taken for establishing the cordless link.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A base unit included in a cordless telephone which also includes a handset cordlessly linked to the base unit, the base unit functioning as a cradle for holding the handset for charging, the base unit comprising:

a storage means for storing a security ID;

a detection means for detecting a start of a charge which occurs when a handset is placed on the base unit;

a first transmission means for transmitting the security ID stored in the storage means to the handset when the detection means detects the start of the charge;

a generating means for generating a new security ID which is different from the security ID stored in the storage means;

a second transmission means for transmitting the new security ID to the handset;

a judging means for, if a response has been received from the handset, judging whether the response corresponds to the security ID transmitted by the first ransmission means or the new security ID transmitted by the second transmission means;

a link means for establishing a cordless link with the handset when the judging means judges that the response has been received from the handset; and an update means for updating the security ID stored in the storage means to the new security ID when the judging means judges that the response has been received and when the received response corresponds to the new security ID.

2. The base unit of claim 1, wherein the generating means generates the new security ID after the detection means detects the start of the charge.

3. The base unit of claim 2, wherein the first transmission means includes a serial port which is used to output and input serial data to/from the handset, the first transmission means transmits the security ID stored in the storage means to the handset via the serial port after the detection means detects the start of the charge, and the second transmission means transmits the new security ID via the serial port included in the first transmission means.

4. The base unit of claims 3, wherein the serial port doubles as a power supply line used for charging, the first transmission means includes a multiplexing means for multiplexing serial data into the power supply line, the first transmission means causes the multiplexing means to transmit the security ID to the handset via the power supply line by multiplexing the security ID stored in the storage means into a power supply line after the detection means detects the start of the charge, and the second transmission means causes the multiplexing means to transmit the new security ID to the handset via the power supply line by multiplexing the new security ID into the power supply line.

5. A base unit included in a cordless telephone which also includes a handset cordlessly linked to the base unit functioning as a cradle for holding the handset for charging, the base unit comprising:

a storage means for storing a security ID;

a detection means for detecting a start of a charge which occurs when a handset is placed on the base unit;

a first transmission means for transmitting the security ID stored in the storage means to the handset when the detection means detects the start of the charge;

a generating means for generating a new security ID which is different from the security ID stored in the storage means;

a second transmission means for transmitting the new security ID to the handset;

a judging means for judging whether a response corresponds to either the security ID transmitted by the first transmission means or the new security ID transmitted by the second transmission means has been received from the handset;

a link means for establishing a cordless link with the handset when the judging means judges that the response has been received from the handset; and an update means for updating the security ID stored in the storage means to the new security ID when the judging means judges that the response has been received and when the received response corresponds to the new security ID, wherein the generating means includes a timer which counts a predetermined time from the transmission of the security ID stored in the storage means, wherein the generating means generates the new security ID when a response from the handset is not received within the predetermined time.

6. The base unit of claim 5, wherein the first transmission means includes a serial port which is used to output and input serial data to/from the handset, the first transmission means transmits the security ID stored in the storage means to the handset via the serial port after the detection means detects the start of the charge, and the second transmission means transmits the new security ID via the serial port included in the first transmission means.

7. The base unit of claim 6, wherein the serial port doubles as a power supply line used for charging, the first transmission means includes a multiplexing means for multiplexing serial data into the power supply line, the first transmission means causes the multiplexing means to transmit the security ID to the handset via the power supply line by multiplexing the security ID stored in the storage means into a power supply line after the detection means detects the start of the charge, and the second transmission means causes the multiplexing means to transmit the new security ID to the handset via the power supply line by multiplexing the new security ID into the power supply line.

8. A handset included in a cordless telephone which also includes a base unit which is cordlessly linked to the handset and functions as a cradle for holding the handset for charging, the handset comprising:

a storage means for storing a security ID;

a detection means for detecting a start of a charge which occurs when the handset is placed on a base unit;

a first reception means for receiving a first security ID which is transmitted from the base unit after the detection means detects the start of the charge;

a second reception means for receiving a second security ID transmitted from the base unit;

a judging means for judging whether the first security ID matches the security ID stored in the storage means;

an update means for updating the security ID stored in the storage means to the second security ID when the judging means judges that the first security ID does not match the security ID stored in the storage means; and a link means for requesting the base unit to establish a cordless link between the base unit and the handset in response to the first security ID when the judging means judges that the first security ID matches the security ID stored in the storage means, and in response to the second security ID when the judging means judges that the first security ID does not match the security ID stored in the storage means.

9. The handset of claim 8, wherein the first reception means includes a serial port which is used to output and input serial data to/from the base unit, the first reception means receives the first security ID via the serial port after the detection means detects the start of the charge, and the second reception means receives the second security ID via the serial port in the first reception means.

10. The handset of claim 9, wherein the second reception means receives the second security ID after the judging means judges that the first security ID does not match the security ID stored in the storage means.

11. The handset of claim 10, wherein the first reception means includes a separation means for separating serial data from a power supply line which is the serial port, the first reception means causes the separation means to receive the first security ID by separating the first security ID from the power supply line after the detection means detects the start of the charge, and the second reception means causes the separation means to receive the second security ID by separating the second security ID from the power supply line.

12. A cordless telephone including a base unit and a handset which are cordlessly linked to each other, the base unit functioning as a cradle for holding the handset for charging, the base unit comprising:

a first storage means for storing a security ID;

a first detection means for detecting a start of a charge which occurs when a handset is placed on the base unit;

a first transmission means for transmitting the security ID stored in the storage means to the handset when the first detection means detects the start of the charge;

a generating means for generating a new security ID which is different from the security ID stored in the first storage means;

a second transmission means for transmitting the new security ID to the handset;

a first judging means for judging whether a response corresponding to either the security ID transmitted by the first transmission means or the new security ID transmitted by the second transmission means has been received from the handset;

a first link means for establishing a cordless link with the handset when the first judging means judges that the response has been received from the handset; and a first update means for updating the security ID stored in the first storage means to the new security ID when the first judging means judges that the response has been received and when the received response corresponds to the new security ID, the handset comprising: a second storage means for storing the security ID;
   a detection means for detecting the start of the charge;
   a first reception means for receiving a first security ID which is transmitted from the base unit after the detection means detects the start of the charge;
   a second reception means for receiving a second security ID transmitted from the base unit;
   a second judging means for judging whether the first security ID matches the security ID stored in the second storage means;
   a second update means for updating the security ID stored in the second storage means to the second security ID when the second judging means judges that the first security ID does not match the security ID stored in the second storage means; and
   a second link means for requesting the base unit to establish a cordless link between the base unit and the handset in response to the first security ID when the second judging means judges that the first security ID matches the security ID stored in the second storage means, and in response to the second security ID when the second judging means judges that the first security ID does not match the security ID stored in the second storage means.

13. The cordless telephone of claim 12, wherein
the generating means includes a timer which counts an elapsed time since the transmission of the security ID stored in the first storage means, wherein
the generating means generates the new security ID when the elapsed time counted by the timer expires a predetermined time without reception of a response from the handset.

14. The cordless telephone of claim 13, wherein
the first transmission means includes a first serial port which is used to output and input serial data to/from the handset,
the first transmission means transmits the security ID stored in the first storage means to the handset via the first serial port after the first detection means detects the start of the charge,
the second transmission means transmits the new security ID via the first serial port included in the first transmission means,
the first reception means includes a second serial port which is used to output and input serial data to/from the base unit,
the first reception means receives the first security ID via the second serial port after the second detection means detects the start of the charge, and
the second reception means receives the second security ID via the second serial port in the first reception means.

15. The cordless telephone of claim 14, wherein
the serial port doubles as a power supply line used for charging,
the first transmission means includes a multiplexing means for multiplexing serial data into the power supply line,
the first transmission means causes the multiplexing means to transmit the security ID to the handset via the power supply line by multiplexing the security ID stored in the first storage means into a power supply line after the first detection means detects the start of the charge,
the second transmission means causes the multiplexing means to transmit the new security ID to the handset via the power supply line by multiplexing the new security ID into the power supply line,
the first reception means includes a separation means for separating serial data from a power supply line which is the serial port,
the first reception means causes the separation means to receive the first security ID by separating the first security ID from the power supply line after the detection means detects the start of the charge, and
the second reception means causes the separation means to receive the second security ID by separating the second security ID from the power supply line.

16. The cordless telephone of claim 12, wherein
the generating means generates the new security ID after the first detection means detects the start of the charge.

17. The cordless telephone of claim 16, wherein
the first transmission means includes a first serial port which is used to output and input serial data to/from the handset,
the first transmission means transmits the security ID stored in the first storage means to the handset via the first serial port after the first detection means detects the start of the charge,
the second transmission means transmits the new security ID via the first serial port included in the first transmission means,
the first reception means includes a second serial port which is used to output and input serial data to/from the base unit,
the first reception means receives the first security ID via the second serial port after the second detection means detects the start of the charge, and
the second reception means receives the second security ID via the second serial port in the first reception means.

18. The cordless telephone of claim 17, wherein
the serial port doubles as a power supply line used for charging,
the first transmission means includes a multiplexing means for multiplexing serial data into the power supply line,
the first transmission means causes the multiplexing means to transmit the security ID to the handset via the power supply line by multiplexing the security ID stored in the first storage means into a power supply line after the first detection means detects the start of the charge,
the second transmission means causes the multiplexing means to transmit the new security ID to the handset via the power supply line by multiplexing the new security ID into the power supply line,
the first reception means includes a separation means for separating serial data from a power supply line which is the serial port,
the first reception means causes the separation means to receive the first security ID by separating the first security ID from the power supply line after the detection means detects the start of the charge, and
the second reception means causes the separation means to receive the second security ID by separating the second security ID from the power supply line.

* * * * *